United States Patent [19]
Miyazaki

[11] Patent Number: 5,816,518
[45] Date of Patent: Oct. 6, 1998

[54] DOUBLE BEARING TYPE REEL FOR FISHING

[75] Inventor: Takeo Miyazaki, Tokyo, Japan

[73] Assignee: Daiwa Seiko, Inc., Tokyo, Japan

[21] Appl. No.: 828,717

[22] Filed: Mar. 28, 1997

Related U.S. Application Data

[63] Continuation of Ser. No. 412,445, Mar. 29, 1995, abandoned.

[30] Foreign Application Priority Data

Mar. 30, 1994 [JP] Japan .................................. 6-129479

[51] Int. Cl.$^6$ .................................................. A01K 89/015
[52] U.S. Cl. ........................................... 242/310; 242/319
[58] Field of Search .................................... 242/319, 310, 242/274, 279

[56] References Cited

U.S. PATENT DOCUMENTS

| 4,750,684 | 6/1988 | Morimoto | 242/279 X |
|---|---|---|---|
| 5,308,019 | 5/1994 | Karlsson | 242/310 X |

FOREIGN PATENT DOCUMENTS

| 60-55369 | 4/1985 | Japan . |
|---|---|---|
| 3-114960 | 11/1991 | Japan . |
| 4-91678 | 8/1992 | Japan . |
| 4-117576 | 10/1992 | Japan . |

OTHER PUBLICATIONS

Zebco Motor Guide, pp. 4–5, 1987.

*Primary Examiner*—Daniel P. Stodola
*Assistant Examiner*—Emmanuel M. Marcelo
*Attorney, Agent, or Firm*—Longacre & White

[57] ABSTRACT

A double bearing type reel for fishing is provided which can protect a level wind device more positively and can simplify an assembling operation. The double bearing type reel for fishing includes a reel main body having a frame body (1). The frame body (1) includes two right and left side frames (1', 2). The right and left side frames (1', 2) are formed integrally with each other by a support rod (a), a thumb placement portion (1"), a protection portion (2'), a reel leg (2s), and a fixed plate (2"), while the two side frames (1', 2) are held parallel to each other. Reel side plates (3, 4) are respectively mounted to the outer sides of the two right and left side frames (1', 2). A level wind device (A) and a spool (5) are respectively interposed between the right and left side frames (1', 2). The reel outer side plates (3, 4) respectively include in the front portions thereof extension portions (3a, 4a) which extend toward each other.

7 Claims, 7 Drawing Sheets

DOUBLE BEARING TYPE REEL FOR FISHING

This is a continuation of application Ser. No. 08/412,445, filed Mar. 29, 1995, which was abandoned upon the filing hereof.

BACKGROUND OF THE INVENTION

The present invention relates to a double bearing type reel for fishing including a level wind device.

In (1) Japanese Utility Model Kokai Publication No. Hei. 3-114960, (2) Japanese Utility Model Kokai Publication No. Hei. 4-91678, (3) Japanese Utility Model Kokai Publication No. Sho. 60-55369 and the like, there are disclosed double bearing reels for fishing of a type which includes a level wind device for winding a fishline uniformly around a spool rotatably supported on a frame body, and a thumb placement portion for improving the holdability of the reel, which is located between two outer side plates respectively mounted on the outer sides of the frame body.

However, the above-mentioned double bearing reels raise the following problems:

In the reel disclosed in the publication (1), there is no structural consideration to the protection of the level wind device and the level wind device is exposed. In actual fishing, the reel can be fallen down by mistake onto the ground or can be knocked against other hard things. That is, in such cases, external forces can be often applied to the level wind devices. In this sense, the operation of the level wind device is difficult to be stabilized.

Further, when an operator holds the reel, the fingers of the operator are likely to be pinched between the sliding member of the level wind device reciprocating right and left and the frame body. This is dangerous and, therefore, the reel disclosed in the publication (1) raises a problem in safety.

In the reel disclosed in the pulication (2), there is employed a structure in which the thumb placement portion and a protection member provided in front of the level wind device are formed separately from each other and are mounted between the outer side frames of the frame body of the reel main body. In this structure, the number of required parts is large and thus the assembling operation thereof cannot be performed efficiently. Also, during the handling operation of the frame body as a single part, the level wind mounting portion thereof can be deformed to have an ill effect on the level wind operation.

In the reel disclosed in the publication (3), there is used a structure in which the thumb placement portion and a cover member including a fishline guide hole are mounted between the two side plates. In this structure, however, the number of parts is large and also the cover member has a complicated shape, which results in a poor assembling operation efficiency. Also, during the handling operation of the frame body as a single part, the level wind mounting portion thereof can be deformed to have an ill effect on the level wind operation.

Also, conventionally, there is known in Japanese Utility Model Publication No. 4-117576 of Heisei another double bearing type reel for fishing in which right and left frame members are connected integrally with each other by a support rod.

However, in this reel as well, since a level wind device is exposed, there arise problems similar to the above-mentioned conventional double bearing type reel.

As described above, in the conventional double bearing type reels for fishing, since no structural consideration is given to the protection of the level wind device and thus the level wind device is exposed, there are possibilities that the operator's hand can touch the moving sliding member and the external forces can be given to the reel to thereby unstabilize the operation of the level wind device. When the separate protection member is mounted to the reel, the number of parts is increased, which in turn lowers an efficiency in assembling the parts.

SUMMARY OF THE INVENTION

The present invention aims at eliminating the above drawbacks found in the conventional double bearing type reels for fishing. Accordingly, it is an object of the invention to provide a double bearing type reel for fishing which can protect the level wind device and can simplify the assembling operation.

In attaining the above object, according to the invention, there is provided a double bearing type reel for fishing in which a frame body of a reel main body is made up of two right and left side frames and a support rod for connecting the two right and left side frames integrally with each other, and a level wind device for winding a fishline uniformly around a spool rotatably supported by the reel main body is interposed between two side frames disposed in the front portion of the frame body, characterized in that, between the two front side frames of the frame body, a thumb placement portion on which a thumb can be placed and a protection portion for protecting the front portion of a sliding member of the level wind device are formed integrally with the frame body, and the thumb placement portion, protecting portion and two side frames cooperate in defining a fishline guide window hole.

According to the double bearing type reel for fishing of the present invention, since a protection portion is formed integrally with a frame body, the frame body and protection portion are respectively reinforced to thereby eliminate the possibility that a level wind device can be deformed or broken while handling the frame body as a single part. Also, the integral formation of the frame body and protection portion not only reduces the number of parts but also eliminates the possibility that the fingers of the operator's hand holding the reel can be caught in between the frame body and a sliding member provided in the level wind device which can reciprocate right and left.

In the double bearing type reel for fishing according to the present invention, in the front portion of one of two outer plates to be mounted respectively on the two sides of the frame body, there is provided an extension portion in such a manner that it projects toward the other outer side plate, and the extension portion is disposed in the front portion of a protection portion formed in the front portion of the frame body.

Because the level wind device is protected not only by the protection portion but also by extension portions and respectively provided in the front portions of reel outer side plates for covering the protection portion, the level wind device can be sufficiently protected against strong external forces so that it can be used stably all the time even under a severe fishing environment.

Further, according to the invention, there is provided a double bearing type reel for fishing in which a frame body of a reel main body is made up of right and left side plates and a support rod for connecting the two right and left side plates integrally with each other, and a level wind device for winding a fishline uniformly around a spool rotatably supported by the reel main body, characterized in that, in the front portion of one of two outer side plates to be mounted respectively on the two sides of the frame body, there is provided an extension portion in such a manner that the extension portion projects toward the other outer side plate.

According to the double bearing type reel for fishing, due to the fact that a level wind device is protected against external forces by extension portions respectively formed in the front portions of reel outer side plates and also that the front portions of the extension portions can be touched and held by the forefinger of the operator's hand holding the reel, the reel can be held positively in a stable condition.

BRIEF DESCRIPTION OF THE DRAWINGS

In the accompanying drawings:

FIG. 11 (*a*) is a side view of one side of a guide member employed in a level wind device;

FIG. 11 (*b*) is a side view of the other side of the guide member;

FIG. 11 (*c*) is a back view of the guide member:

DETAILED DESCRIPTION OF THE PREFERRED EMBODIMENTS

Now, description will be given below of an embodiment of a double bearing type reel for fishing according to the invention with reference to the accompanying drawings.

Figure 1:
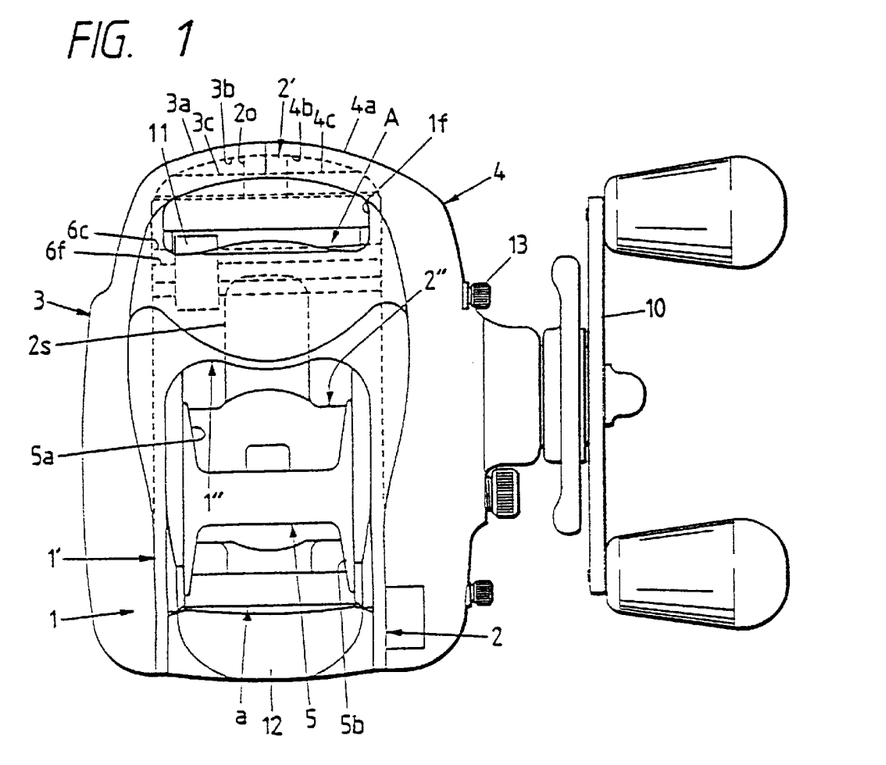
FIG. 1 is a plan view of an embodiment of a double bearing type reel for fishing according to the invention.

In a double bearing type reel for fishing shown in FIG. 1, a reel main body comprises a frame body 1 which in turn includes two right and left side frames 1' and 2. The right and left side frames 1' and 2 are formed integrally with each other by a support rod a, a thumb placement portion 1", a protection portion 2', and a fixed plate 2" of a reel leg, while the right and left side frames 1' and 2 are held parallel to each other by these parts.

Reel side plates 3 and 4 are mounted to the outsides of the two right and left side frames 1' and 2, respectively.

A level wind device A and a spool 5 are interposed between the two right and left side frames 1' and 2 at respective positions. The spool 5 can be rotated through a clutch mechanism, a gear train mechanism, and a handle shaft (which are not shown) provided in the reel side plate 4, while a sliding member 11 of the level wind device A can be moved right and left.

Figure 2:
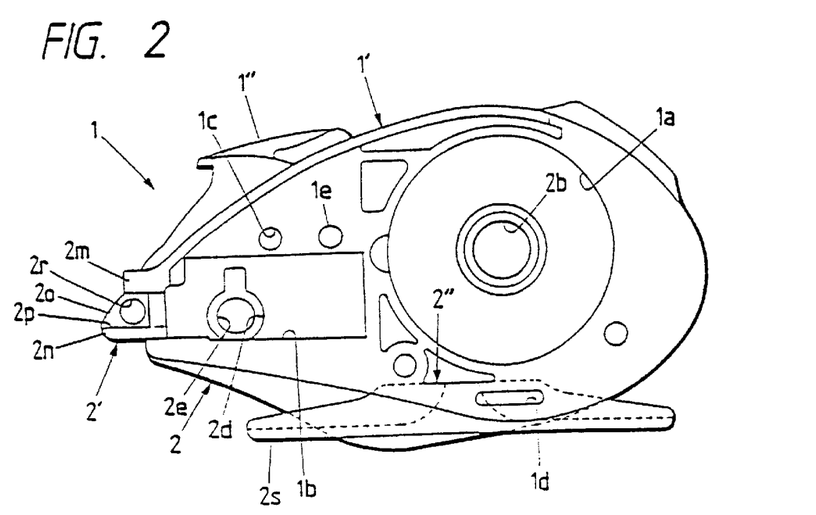
FIG. 2 is a side view of one side of a frame body employed in the invention.
Figure 3:
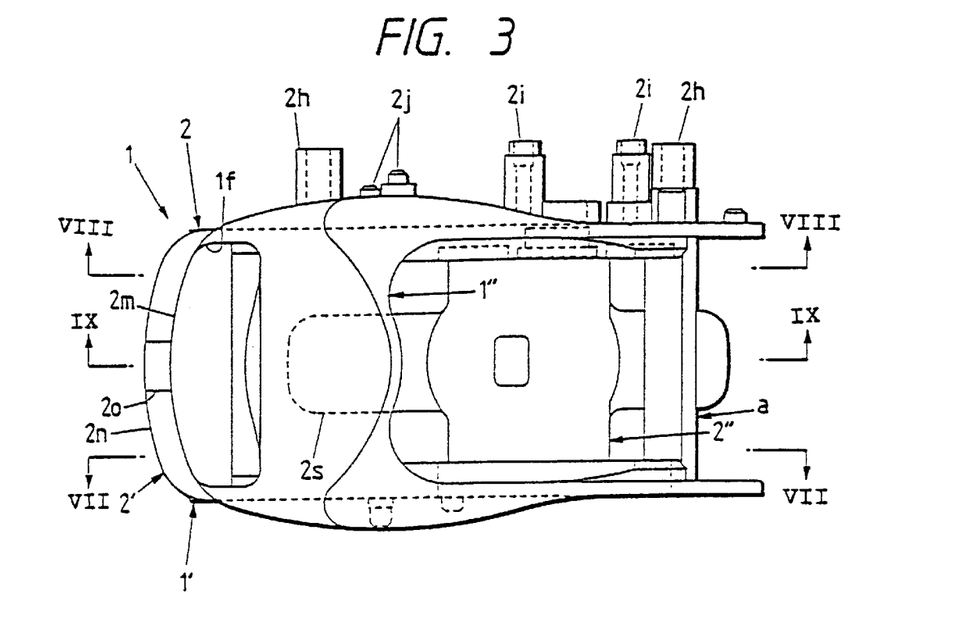
FIG. 3 is a plan view of the frame body.
Figure 4:
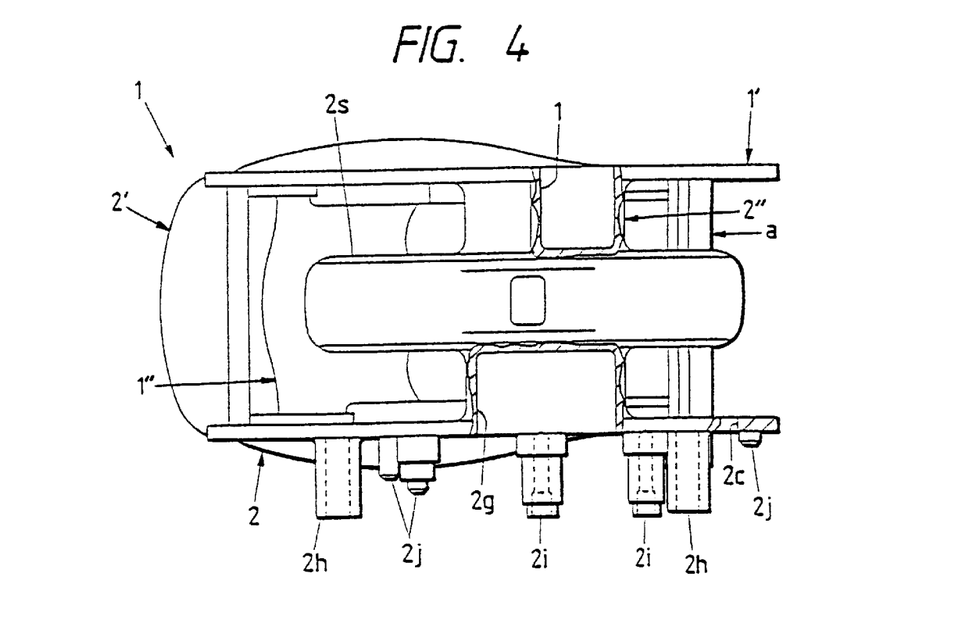
FIG. 4 is a bottom view of the frame body.
Figure 5:
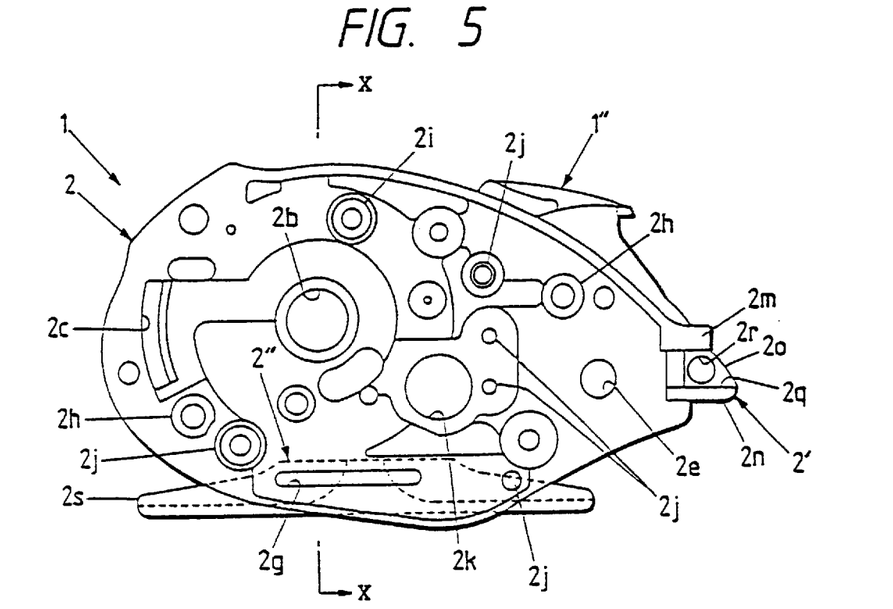
FIG. 5 is a side view of the other side of the frame body.
Figure 6:
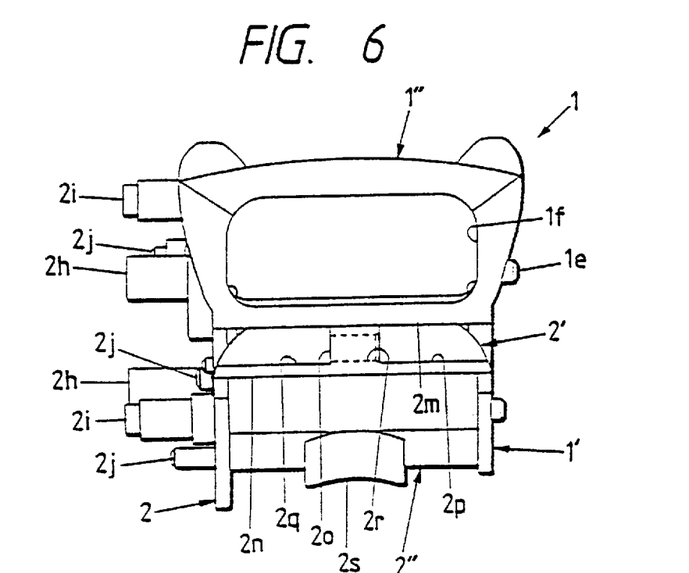
FIG. 6 is a front view of the frame body.
Figure 7:
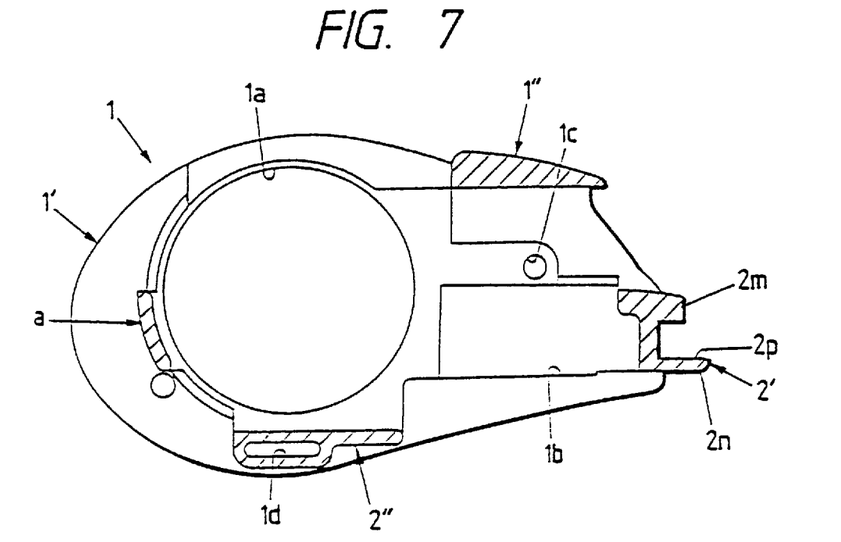
FIG. 7 is a sectional side view of the inner portion of one side of the frame body, taken along the section line VII—VII shown in FIG. 3.

The side frame 1' includes a through hole 1a having a large diameter and a rectangular through hole 1b. As shown in FIGS. 2 and 7, the through hole 1a is formed in the central portion of the side frame 1', into which through hole 1a a flange portion 5a provided in the spool 5 can be fitted, while the through hole 1b is formed in the front portion of the side frame 1'.

Another through hole 1c is opened up above the rectangular through hole 1b.

The support rod a, thumb placement portion 1", protection portion 2', and one end of the fixed plate 2" are respectively fixed to the inner side of the side frame 1'.

In the fixed plate 2" located below the large-diameter through hole 1a, as shown in FIGS. 2, 4, 7 and 10, there is formed a transverse hole 1d which extends from the outside of the side frame 1'.

A pin 1e is disposed above the rectangular through hole 1b formed on the outside of the side frame 1'.

Figure 11A:
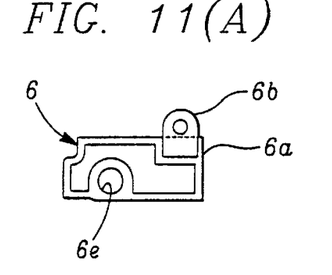
Figure 11B:
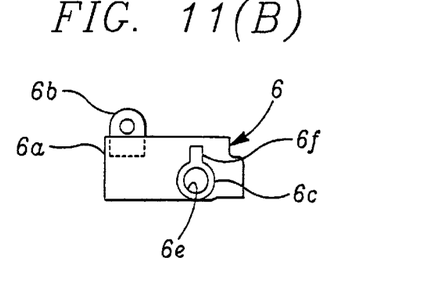
Figure 11C:
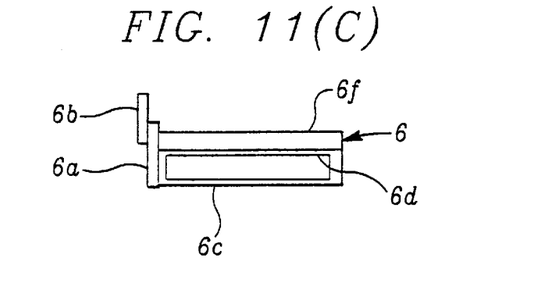

A wall portion 6a of one side of a guide member 6 provided in the level wind device A, which is shown in FIG. 11, is fitted into the rectangular through hole 1b, a tongue piece 6b formed in the guide member 6 is fitted with the pin 1e, and the guide member 6 is fixed to the side frame 1' by an E ring (not shown) or the like.

The thumb placement portion 1", protection portion 2', and two side frames 1', 2 cooperate in defining a fishline guide window hole 1f.

Figure 8:
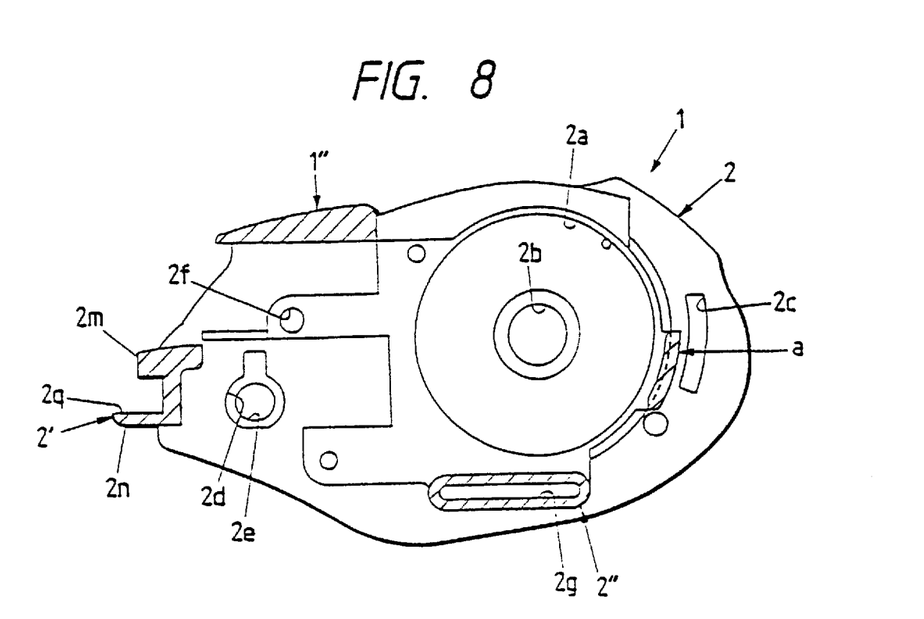
FIG. 8 is a sectional side view of the inner portion of the other side of the frame body, taken along the section line VIII—VIII shown in FIG. 3.
Figure 9:
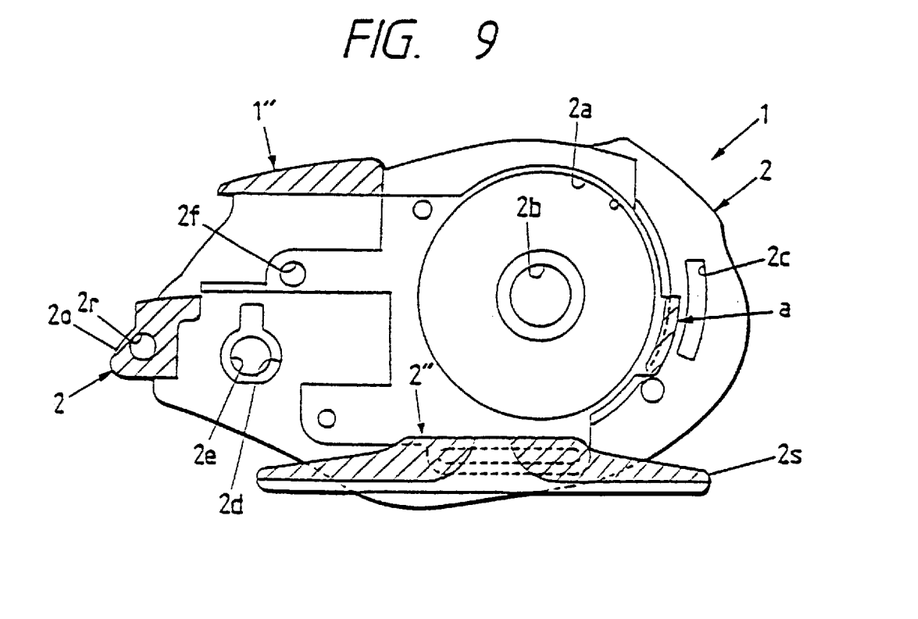
FIG. 9 is a sectional side view of the inner portion of the other side of the frame body, taken along the section line IX—IX shown in FIG. 3.
Figure 10:
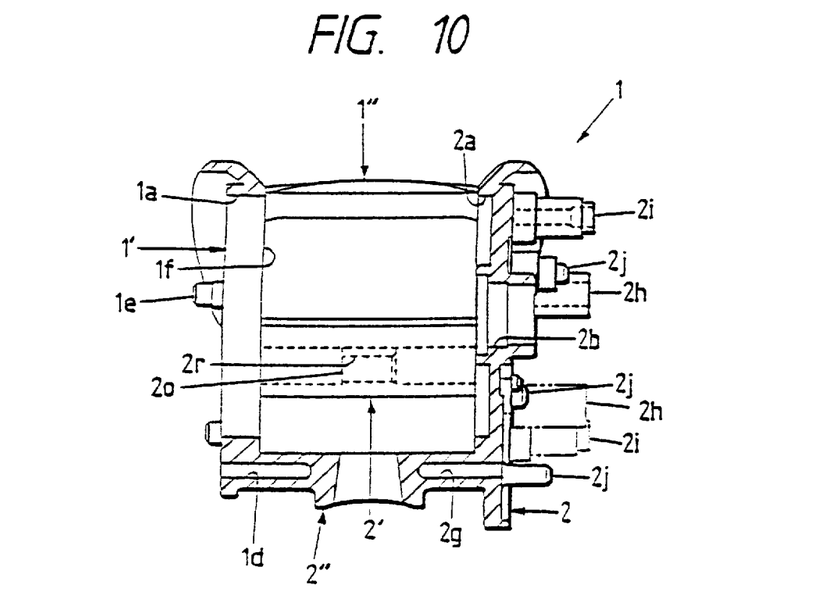
FIG. 10 is a back view of the frame body, taken along the section line X—X shown in FIG. 5.

The side frame 2 includes on the inner side thereof, as shown in FIGS. 8 to 10, a large-diameter recessed portion 2a, which is formed in the central portion thereof and into which a flange portion 5b of the spool 5 can be fitted, and a shaft hole 2b for a spool shaft (not shown).

Outside the recessed portion 2a, there is opened up an elongated hole 2c through which a connecting rod of an operation rod 12 of a clutch operation member can be inserted.

In the front portion of the inner side of the side frame 2, there are formed a projection-shaped recessed portion 2d and a through hole 2e.

Above the projection-shaped recessed portion 2d, there is opened up a through hole 2f into which a screw rod 13 shown in FIG. 1 is inserted.

The support rod a, thumb placement portion 1", protection portion 2', and the other end of the fixed plate 2" are respectively fixed to the inner side of the side frame 2.

In the fixed plate 2", as shown in FIGS. 4, 5, 8 and 10, there is formed a transverse hole 2g which extends from the outside of the side frame 2.

On the outer side of the side frame 2, as shown in FIGS. 3 to 6 and 10, there are provided a plurality of support props 2h, support shafts 2i and pins 2j.

Further, on the outer side of the side frame 2, there is formed a recessed portion 2k into which one end of a handle shaft (not shown) can be fitted.

In the front portion of the protection portion 2', there are formed upper and lower transverse piece portions 2m, 2n, and right and left recessed portions 2p, 2q, with a projecting portion 2o left between them. Also, a through hole 2r is opened up in the projecting portion 2o.

Inside the protection portion 2', there is positioned a hollow shaft 6c, which is provided in the guide member 6 of the level wind device A and has a projection-like section.

The hollow shaft 6c includes a window hole 6d opened up in the rear face thereof.

The hollow shaft 6c also includes a through hole 6e into which a shaft (not shown) is fitted, while the sliding member 11 is fitted reciprocatably right and left with the outer periphery of the hollow shaft 6c and is prevented against rotation by a projection portion 6f.

A reel leg 2s is fixed integrally to the fixed plate 2", as shown in FIG. 9.

In the respective front portions of the reel outer side plates 3, 4 respectively mounted to the outer sides of the two right and left side frames 1', 2 as shown in FIG. 1, there are formed the extension portions 3a and 4a which respectively extend toward each other.

The extension portions 3a and 4a includes their inner sides which are respectively formed in recessed portions 3b and 4b, while pin shafts 3c and 4c are respectively provided in these recessed portions 3b and 4b.

When the reel outer side plates 3 and 4 are mounted in such a manner that the protection portion 2' is covered with the extension portion 3a and 4a, the transverse piece portion 2n located in the lower portion of the protection portion 2' is caught into between the recessed portion, while the pin shafts 3c and 4c are inserted into the through hole 2r formed in the projecting portion 2o of the protection portion 2'.

Figure 12:
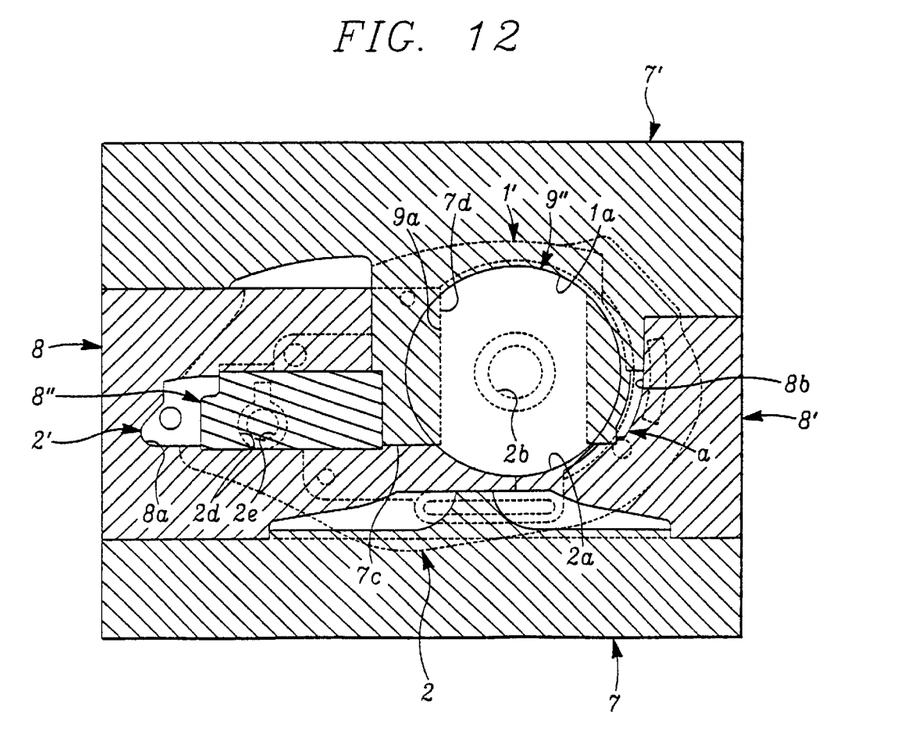
FIG. 12 is a side view of a metal mold for molding the frame body.
Figure 13:
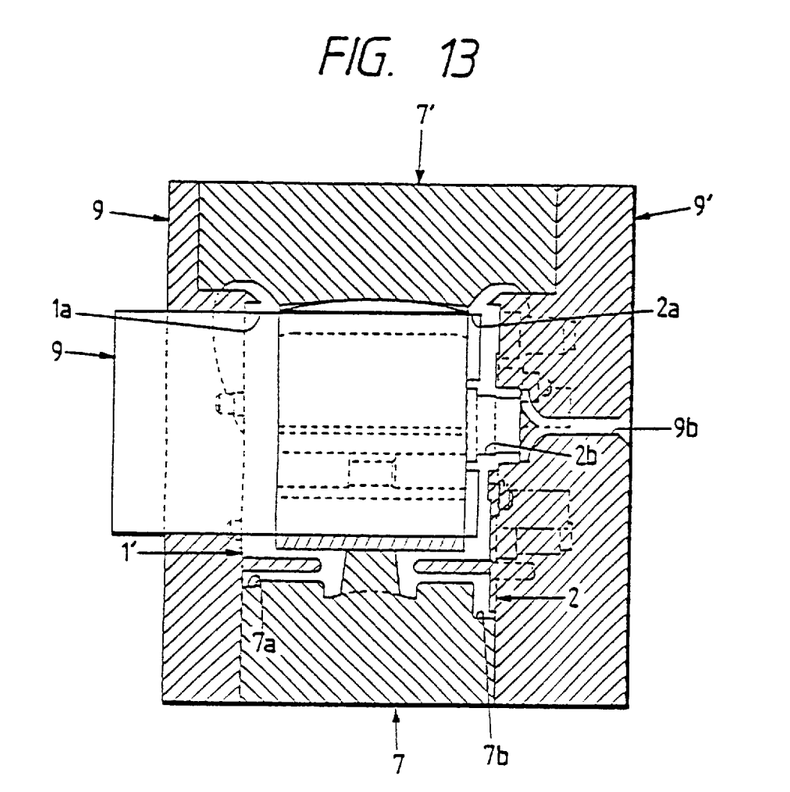
FIG. 13 is a back view of the above metal mold for molding the frame body.
Figure 14:
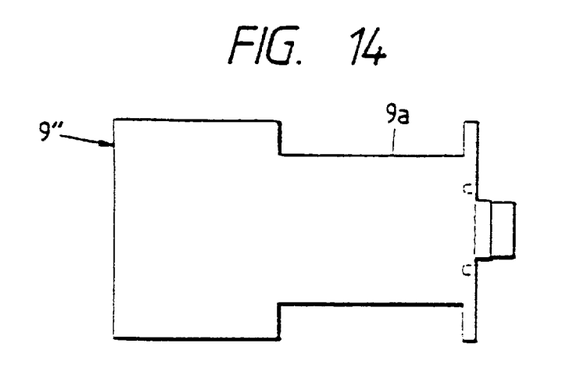
FIG. 14 is a plan view of a first auxiliary metal mold for forming the frame body.

When the frame body 1 is formed, there is used a metal mold which is shown in FIGS. 12 to 14.

The metal mold includes a lower mold 7, an upper mold 7', a front mold 8, and a rear mold 8' respectively shown in FIG. 12, as well as a left mold 9, a right mold 9', a first right auxiliary mold 9'", and a second right auxiliary mold 8" respectively shown in FIG. 13.

The lower mold 7 includes a recessed portion for defining the respective lower outer shapes of the side frames 1' and 2, a projecting portion for forming a space between the side frames 1' and 2, and a recessed portion for forming the reel leg 2s.

Also, the upper mold 7' includes recessed portions 7a and 7b respectively for forming the respective upper outer shapes of the side frames 1' and 2, and a projecting portion 7c for defining a space between the side frames 1' and 2.

Further, the upper mold 7' and first right auxiliary mold 9'" respectively include an engaging portion 7d and an engaging projecting portion 9a which are meshable with each other.

The first auxiliary mold 9'", as shown in FIGS. 13 and 14, comprises a large-diameter through hole 1a, into which the flange portion 5a of the spool 5 provided in the central portion of the side frame 1' can be fitted, a large-diameter recessed portion 2a, into which the flange portion 5b of the spool 5 provided in the central portion of the side frame 2 can be fitted, and a shaft hole 2b for a spool shaft (not shown).

The front metal mold 8 includes a recessed portion 8a for defining the protection portion 2', recessed portions respectively for defining the respective front outer shapes of the side frames 1' and 2, and a projecting portion for defining a space between the side frames 1' and 2 as well as a space between the thumb placement portion 1" and reel leg 2s.

The recessed portion 8a is formed in a rectangular shape, while the second right auxiliary mold 8" is inserted into the recessed portion 8a.

A space formed by the recessed portion 8a can be filled up with the second right auxiliary mold 8", while the front metal mold 8 further comprises a rectangular through hole 1b formed in the front portion of the side frame 1', a projection-like recessed portion 2d formed in the front portion of the inner side of the side frame 2, and a projecting portion for defining the through hole 2e.

The rear metal mold 8' includes a recessed portion 8b for defining the support rod a, recessed portions respectively for defining the respective rear outer shapes of the side frames 1' and 2, and a projecting portion for defining the space between the side frames 1' and 2 as well as the space between the support rod a and reel leg 2s.

The left metal mold 9 and right metal mold 9' respectively include a recessed portion and a projecting portion which define the side walls of the side frames 1' and 2.

The right metal mold 9' includes a resin injection hole 9b.

It should be noted here that a resin injection hole may be formed in any of the other metal molds as well.

When the frame body 1 is formed in the above-mentioned manner, the level wind device A, which can reciprocate right and left in linking with the take-up operation of the handle 10, can be protected against external forces not only by the protection portion 2' but also by the extension portions 3a and 4a respectively formed in the front portions of the reel outer side plates 3 and 4 for covering the protection portion 2'.

Since the level wind device A is protected in this manner, the device A can never be deformed due to the external forces.

Further, when an operator holds the reel, there is eliminated the possibility that the fingers of the operator's hand can be caught in between the sliding member 11 of the level wind device A reciprocatable right and left and the frame body 1, thereby improving the safety of the operator.

Since the protection portion 2' is formed integrally with the frame body 1, the frame body 1 and protection portion 2' are both reinforced, which not only can reduce the number of parts but also can eliminate the possibility that the level wind device A can be deformed or broken while the frame body is being handled as a single part.

When the protection portion 2' is covered with the extension portions 3a and 4a of the reel outer side plates 3 and 4, then the level wind device A can be protected and also the number of parts can be reduced, so that the reel can be improved in design.

When the double bearing type reel for fishing is structured in the above-mentioned manner, then the level wind device A reciprocatable right and left in linking with the take-up operation of the handle can be protected against the external forces not only by the protection portion 2' but also by the extension portions 3a and 4a respectively provided in the respective front portions of the reel outer side plates 3 and 4 for covering the protection portion 2'.

When the level wind device A is protected in this manner, then the level wind device A is prevented from being deformed due to the external forces to thereby always be able to maintain a stable and positive parallel winding function.

Further, when an operator holds the reel, there is eliminated the possibility that the fingers of the operator's hand holding the reel can be caught in between the sliding member 11 of the level wind device A reciprocatable right and left and the frame body 1, thereby being able to improve the safety of the operator.

Moreover, since the level wind mounting portion of the frame body of the reel main body is reinforced, there is eliminated the possibility that the level wind mounting portion can be deformed or broken during the handling operation of the frame body as a single part to thereby be able to maintain the dimensional precision thereof at a high level, so that the operation of the reel can be performed smoothly with no problem.

In addition, since the number of parts can be reduced and also since the protection portion 2' for covering the level wind device and the thumb placement portion 1" can be formed in a simple structure, the reel can be made further compact and can be further simplified in structure while improving the practical use thereof.

In the foregoing description, the double bearing type reel for fishing is assumed that the support rod a, thumb placement portion 1", protection portion 2' and fixed plate 2" are all formed integrally with the frame body 1. However, of course, the invention is not limited to this. Alternatively, these components may be formed separately from one another and may be then assembled integrally to the frame body 1 of the double bearing type reel for fishing. After then, the reel outer side plates 3 and 4 respectively including the extension portions 3a and 4a in their respective front portions may be assembled to the double bearing type reel for fishing.

In this case, the protection portion may be omitted so that the strength of the extension portions 3a and 4a can be increased.

Also, with respect to the two pin shafts respectively provided on the inner sides of the extension portions 3a and 4a, one of them may be formed as a pin shaft, while the other may be formed in a through hole into which the pin shaft can be inserted.

As has been described heretofore, according to the invention, since the protection portion is formed integrally with the frame body, both of the frame body and protection portion are reinforced to thereby eliminate the possibility that the level wind device can be deformed or broken while the frame body is being handled as a single part. This in turn allows the level wind device to maintain its dimensional precision at a high level and thus the level wind device can be operated smoothly with no problem. Also, since the level wind device is protected in this manner, the level wind device can never be deformed by external forces so that it is always able to maintain a stable and positive parallel winding function.

And the number of parts can be reduced and there is eliminated the possibility that, when holding the reel, the fingers of the hand holding the reel can be caught in between the frame body and the sliding member of the level wind device reciprocatable right and left, thereby being able to improve the reel in safety.

Also, according to the double bearing type reel for fishing, because the level wind device is protected not only by the protection portion but also by the extension portions respectively provided in the respective front portions of the reel outer side plates for covering the protection portion, the level wind device can be protected sufficiently against the strong external forces and thus can be always used stably even under severe fishing environments.

Further, according to the double bearing type reel for fishing, not only because the level wind device is protected against the external forces by the extension portions respectively provided in the respective front portions of the reel outer side plates but also because the front portions of the extension portions can be touched and held by the forefinger of the hand holding the reel, the reel can be grasped and held stably and positively.

Therefore, according to the present invention, there can be supplied a double bearing type reel for fishing which can be simplified in structure or can be made compact while improving the practical use thereof, and can be improved in design.

It is claimed:

1. A double bearing type reel for fishing in which a frame body provided in a reel main body is made up of a right and a left side frame and a support rod connecting the right and left frames integrally with each other, and a level wind device for winding a fishline uniformly around a spool rotatable supported on the reel main body is interposed between the side frames respectively disposed in a front portion of the frame body, wherein, between said right and left side frames disposed in the front portion of said frame body, a thumb placement portion allowing a thumb to be placed thereon and a protection portion for protecting the front portion of a sliding member of said level wind device are homogeneously formed as a unitary body with said frame body, and said thumb placement portion, protection portion, and right and left side frames cooperate in defining a fishline guide window hole;

wherein first and second outer side plates are separately mounted respectively to opposite sides of the right and left side frames, an extension portion formed on at least one of said first and second outer side plates extending toward the other outer side plate and disposed adjacent to said protection portion, said extension portion having reinforcing means to structurally reinforce said protection portion formed in the front portion of said frame body and said protection portion comprises an aperture, and said reinforcing means comprises at least one pin extending from said extension portion which is received by said aperture to thereby secure said extension portion to said protection portion.

2. The double bearing type reel according to claim 1, wherein said at least one pin is integrally formed with said extension portion defining a unitary body.

3. A double bearing type reel for fishing in which a frame body provided in a reel main body is made up of a right and a left side frame and a support rod connecting the right and left frames integrally with each other, and a level wind device for winding a fishline uniformly around a spool rotatably supported on the reel main body is interposed between the side frames respectively disposed in a front portion of the frame body, wherein, between said right and left side frames disposed in the front portion of said frame body, a thumb placement portion allowing a thumb to be placed thereon and a protection portion for protecting the front portion of a sliding member of said level wind device are homogeneously formed as a unitary body with said frame body, and said thumb placement portion, protection portion, and right and left side frames cooperate in defining a fishline guide window hole;

wherein first and second outer side plates are separately mounted respectively to opposite sides of the right and left side frames, an extension portion formed on at least one of said first and second outer side plates extending toward the other outer side plate and disposed adjacent to said protection portion, said extension portion having reinforcing means to structurally reinforce said protection portion formed in the front portion of said frame body and said first and second side plates respectively comprise first and second cover members projecting toward each other to thereby form said extension portion, said first and second cover members terminating adjacent to a midpoint of said protection portion and said protection portion comprises an aperture, said reinforcing means comprises at least two pins, each of said first and second cover members having at least one of said at least two pins extending therefrom to penetrate said aperture.

4. The double bearing type reel according to claim 3, wherein each of said first and second cover members is integrally formed with one of said at least two pins each defining a unitary body.

5. A double bearing type reel for fishing in which a frame body provided in a reel main body is made up of a right and a left side frame and a support rod connecting the right and left frames integrally with each other, and a level wind device for winding a fishline uniformly around a spool rotatably supported on the reel main body is interposed between the side frames respectively disposed in a front portion of the frame body, wherein, between said right and left side frames disposed in the front portion of said frame body, a thumb placement portion allowing a thumb to be placed thereon and a protection portion for protecting the front portion of a sliding member of said level wind device are homogeneously formed as a unitary body with said frame body, and said thumb placement portion, protection portion, and right and left side frames cooperate in defining a fishline guide window hole;

wherein first and second outer side plates are separately mounted respectively to opposite sides of the right and left side frames, an extension portion formed on at least one of said first and second outer side plates extending toward the other outer side plate and disposed adjacent to said protection portion, said extension portion having reinforcing means to structurally reinforce said protection portion formed in the front portion of said frame body and said first and second side plates respectively comprise first and second cover members projecting towards each other to thereby form said extension member, said protection portion comprises an aperture, said reinforcing means comprises at least two pins, each of said first and second cover members having at least one of said at least two pins extending therefrom to penetrate said aperture.

6. The double bearing type reel according to claim 5, wherein each of said first and second cover members is integrally formed with one of said at least two pins each defining a unitary body.

7. A double bearing type reel for fishing in which a frame body provided in a reel main body is made up of a right and a left side frame and a support rod connecting the right and left frames integrally with each other, and a level wind device for winding a fishline uniformly around a spool rotatably supported on the reel main body is interposed between the side frames respectively disposed in a front portion of the frame body, wherein, between said right and left side frames disposed in the front portion of said frame body, a thumb placement portion allowing a thumb to be placed thereon and a protection portion for protecting the front portion of a sliding member of said level wind device are formed integrally with said frame body, and said thumb placement portion, protection portion, and right and left side frames cooperate in defining a fishline guide window hole;

wherein first and second outer side plates are separately mounted respectively to opposite sides of the right and left side frames, an extension portion formed on at least one of said first and second outer side plates extending toward the other outer side plate and disposed adjacent to said protection portion, said extension portion having reinforcing means to structurally reinforce said protection portion formed in the front portion of said frame body, said first and second side plates respectively comprise first and second cover members projecting toward each other to thereby form said extension portion, said first and second cover members terminating adjacent to a midpoint of said protection portion, said projection portion comprises an aperture, said reinforcing means comprises at least two pins, each of said first and second cover members having at least one of said at least two pins extending therefrom to penetrate said aperture.

* * * * *